United States Patent [19]

Stoll

[11] 4,231,610
[45] Nov. 4, 1980

[54] CAMPER ANCHORING AND LOCKING STRUCTURE

[76] Inventor: Christopher A. Stoll, 2605 Janice La., Venice, Fla. 33595

[21] Appl. No.: 25,347

[22] Filed: Mar. 30, 1979

[51] Int. Cl.³ .............................................. B60P 3/32
[52] U.S. Cl. .................... 296/167; 296/43; 410/80
[58] Field of Search .............. 296/167, 35.2, 43; 410/49, 46, 71, 73, 76, 80, 81; 248/429, 297

[56] References Cited

U.S. PATENT DOCUMENTS

| | | | |
|---|---|---|---|
| 1,804,542 | 5/1931 | Perin | 410/80 |
| 3,454,253 | 7/1969 | Lippiatt | 296/35.2 |
| 3,671,003 | 6/1972 | Henson | 296/167 |
| 3,814,460 | 6/1974 | Norrish | 296/35.2 |
| 3,910,624 | 10/1975 | Becker | 410/81 |

FOREIGN PATENT DOCUMENTS 1054377  1/1967  United Kingdom ................ 296/167

*Primary Examiner*—Robert R. Song
*Attorney, Agent, or Firm*—Frank P. Cyr

[57] ABSTRACT

An anchoring and locking structure for a camper body adapted to be mounted on the rear of a pick-up type truck. The structure comprises rail-like members which are secured to the underside or bottom of the camper body coupled with mating rail-like members secured to a shaft or post which extend into openings formed in the sides of the truck body. The aforesaid rail-like members engage with one another and are retained in assembled relationship by a wing nut which extends from one of the rail-like members and engages the other said rail-like member. A locking member extends within one of the openings in the side of the truck body and release mechanisms extend between the bottom or floor of the camper and the truck body sides so as to enable one to release the locking mechanisms when it is desired to remove the camper body from the pickup truck.

5 Claims, 3 Drawing Figures

U.S. Patent
Nov. 4, 1980
4,231,610
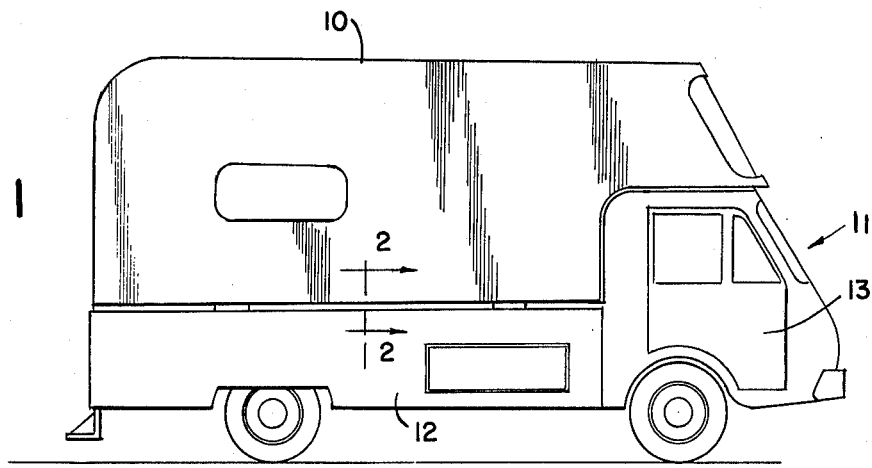
FIG. 1
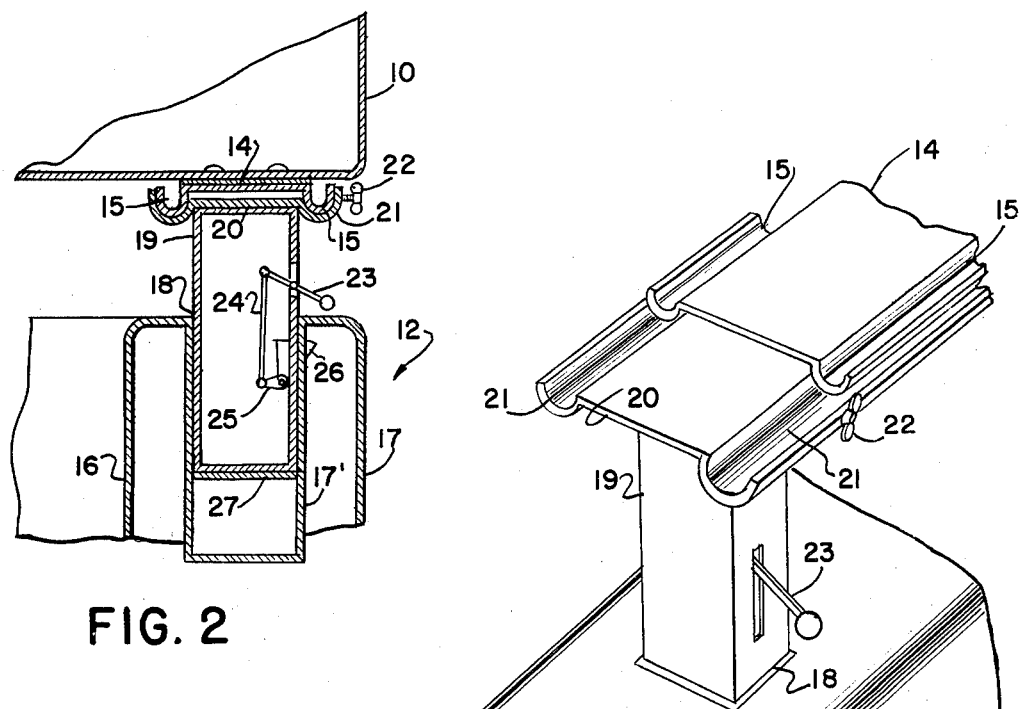
FIG. 2
FIG. 3

CAMPER ANCHORING AND LOCKING STRUCTURE

BACKGROUND OF THE INVENTION

In recent years, pick-up campers have become quite popular and appear on the market in a variety of different shapes, models and designs. The camper is lifted onto the truck body and secured thereto in a number of different ways. As can be appreciated, the anchoring of the camper on the truck body is of utmost importance since during travel of the pick-up truck with the camper mounted thereon, the same is subjected to virbations, shock, etc. as the truck travels on the highway thus necessitating the repositioning of the camper on the pick-up truck body in order to make certain that the camper is properly positioned on the truck body.

With the above in mind it is the primary object of the invention to provide a means which will properly position the camper on the truck body and to also lock the same thereon to thus prevent the accidental removal or shifting of the camper on the truck body once the same has been installed thereon.

Another object of the invention is to provide an attachment which is secured to the underside of the camper body whereby the camper can be mounted and secured to the body of a pick-up truck regardless of where the openings are formed in the truck body which receive the mounting shafts or posts which extend from the underside of the camper body.

As is well known, a pick-up truck having a camper mounted thereon will often deviate from the main highways and travel over rough terrain whether it be to a fishing ground, hinting ground or just a secluded area for a short period of time. Needless to say, when the pick-up with the camper body mounted thereon is subjected to such uneven terrain some means must be provided to insure the proper positioning of the camper on the truck body and not caused to become disengaged from the truck body.

DESCRIPTION OF THE DRAWINGS

FIG. 1 is a perspective view of a pick-up truck having a camper mounted thereon.

FIG. 2 is an enlarged view showing the locking mechanism for the camper when the same has been installed on the back of a pick-up truck body. This view is taken on lines 2—2 of FIG. 1, looking in the direction of the arrows, and, FIG. 3 is also an enlarged view showing the manner in which the channel members interfit with one another to secure the camper on the truck body.

DESCRIPTION OF THE PREFERRED EMBODIMENTS

Refereing now to the drawings wherein like numeral characters are employed to designate like parts throughout the several views thereof, numeral 10 designates a camper body mounted on the rear end portion of a pick-up truck 11 of conventional make. As usual with pick-up trucks, the same are usually provided with a rear extension 12 which extend from the cab 13 of the vehicle.

Pick-up trucks are presently being manufactured and sold by a number of different car and truck manufacturers and the openings formed in the sides at the rear of the cab of the pick-up truck may vary in distance from one opening to the other depending on on the manufacturer of the camper body so that when one wishes to mount a camper on the pick-up truck he must make certain that the shafts or posts extending from below the camper body will register with the aforesaid openings in order to properly secure the camper on to the truck body.

As shown in the drawings, sucured to the undersurface of the camper body is a rail-like member 14. The rail-like member 14 is secured to the undersurface of the camper in any suitable manner as by screws, bolts, etc. and extending along each side edges thereof are a pair of grooved areas 15. extending along the length of the aforesaid rail-like members 14. Usually the rear extension of the truck body comprises a pair of paralell spaced apart sheet metal sections 16 and 17 and it is between these metal sections 16 and 17 that openings 18 are provided to receive therein the shafts or posts 19 which extend from under the undersurface of the camper body.

The shafts of posts 19 are generally square or rectangular in cross section and are welded or otherwise secured to the undersurface of a second rail-like member 20 which is provided with a pair of grooves 21 which will engage with the grooves 15 and nest therewith such as shown more particularly in FIG. 3 of the drawings. A wing nut or like member 22 is threaded into channel member 21 for a purpose to be described more fully hereinafter.

Pivotally mounted along one side of the ahafts or posts 19 is an actuating arm 23 which is accessible from outside of the camper body. The actuating arm 23 connects to a vertically extending arm 24 which in turn is pivotally connected to a horizontally extending arm 25 which is connected to a latch member 26 which extends through suitable openings fromed in the shaft or post 19 and the inner wall 17' of paralelly spaced walls 16 and 17 such as shown in FIG. 2 of the drawings. A spring (not shown) may be mounted on the vertical arm 24 so as to exert a force on the horizontal arm 25 to force the latch 26 into the aforesaid openings formed in the wall of the shaft or post 19 and wall 17'.

As stated previously, there is no uniformity in the spacing of the openings in the truck body so that some means must be provided to enable a camper body to be placed on and retained thereon by means of the shafts or posts extending from the undersurface of the camper body into the aforesaid openings. As explained more fully hereinafter, the structure of the instant invention will obviate this situation.

The manner of operation of the present invention will now be set forth.

As stated previously, the spacing of the shaft or post receiving openings formed in the rear extension of the truck body are not uniform from one truck manufacturer to another. Therefore, the rails which are secured to the undersurface of the camper body need not be affixed thereto with precision. On the contrary, the rails on the undersurface of the camper body may be affixed thereto without accurate measurement as to their position thereon. The only requirement being that the rails extend along the sides of the camper body. The rails 20 which are affixed to the shafts or posts 20 are mounted on the rail-like members 14 which are affixed to the camper body and slid therealong and when the shaft or post 19 is in registry with the opening formed in the sides of the truck body the rails are locked to one another by means of the wing nut 22 which will engage with the grooved portion of the rail 14. When the rails have been so adjusted with respect to one another so that the shaft or post is in registry with the opening in the truck body, the same is lowered into the formed opening and upon reaching it's lowermost travel within opening and abutting a stop wall 27 which may be provided in the opening 18, the latch 26 will be spring pressed outwardly into the opening formed in the wall of the shaft or post 19 and wall 17' such as shown in FIG. 2 of the drawings to thus securely lock the camper body to the rear extension of the truck. The said rail-like members 14 and 20 may extend for the full length of the camper and truck body rear section but for economical reasons the same may be in short sections. To remove the camper body from the truck body one need only to release the latch by actuating the actuating arm 23 and following the release of the latch 26 from within the opening formed in the inner wall 17' the camper may then be removed from the truck body.

Normally, a plurality of openings are provided in the side walls of the rear extension of the truck body for receiving therein the shafts or posts extending from the undersurface of the camper body. As can be appreciated, as many shafts or posts can be employed to properly position the camper body on the truck body. The only limitation being dependent on the number of openings formed in the side walls of the truck body by the manfacturer thereof. Also, as many locking latches may be employed as is believed necessary to lock the camper body on the truck body.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A combined camper anchoring and locking structure for securing a camper body on a truck body comprising a first set of rail members secured to the undersurface of said camper body along the sides thereof, said rail members provided with grooves extending along the edges thereof, a second set of rail members having posts secured thereto and having grooves extending along the edges thereof, openings provided in the sides of said truck body for receiving said posts therein, said grooves in said first and second set of rail members engaging with one another with a means for maintaining said rail members in engaged relationship and a pivoted latch means mounted in said post for engagement with an opening formed in one side wall of said truck body for releasably locking said camper body to said truck body.

2. The structure recited in claim 1 wherein an actuating arm for said pivoted latch extends outwardly along the sides of said camper body and said truck body.

3. The structure recited in claim 1 wherein said first and second sets of said rail members are adjustable relative to one another.

4. The structure recited in claim 1 wherein a plurality of posts are secured to the undersurface of said second set of rail members.

5. The structure recited in claim 4 wherein a plurality of openings are formed along the sides of said truck body for receiving said posts therein.

* * * * *